Oct. 9, 1945.  J. C. STOKES  2,386,514
SIDE HOLE CORING DEVICE
Filed June 11, 1942  2 Sheets-Sheet 1
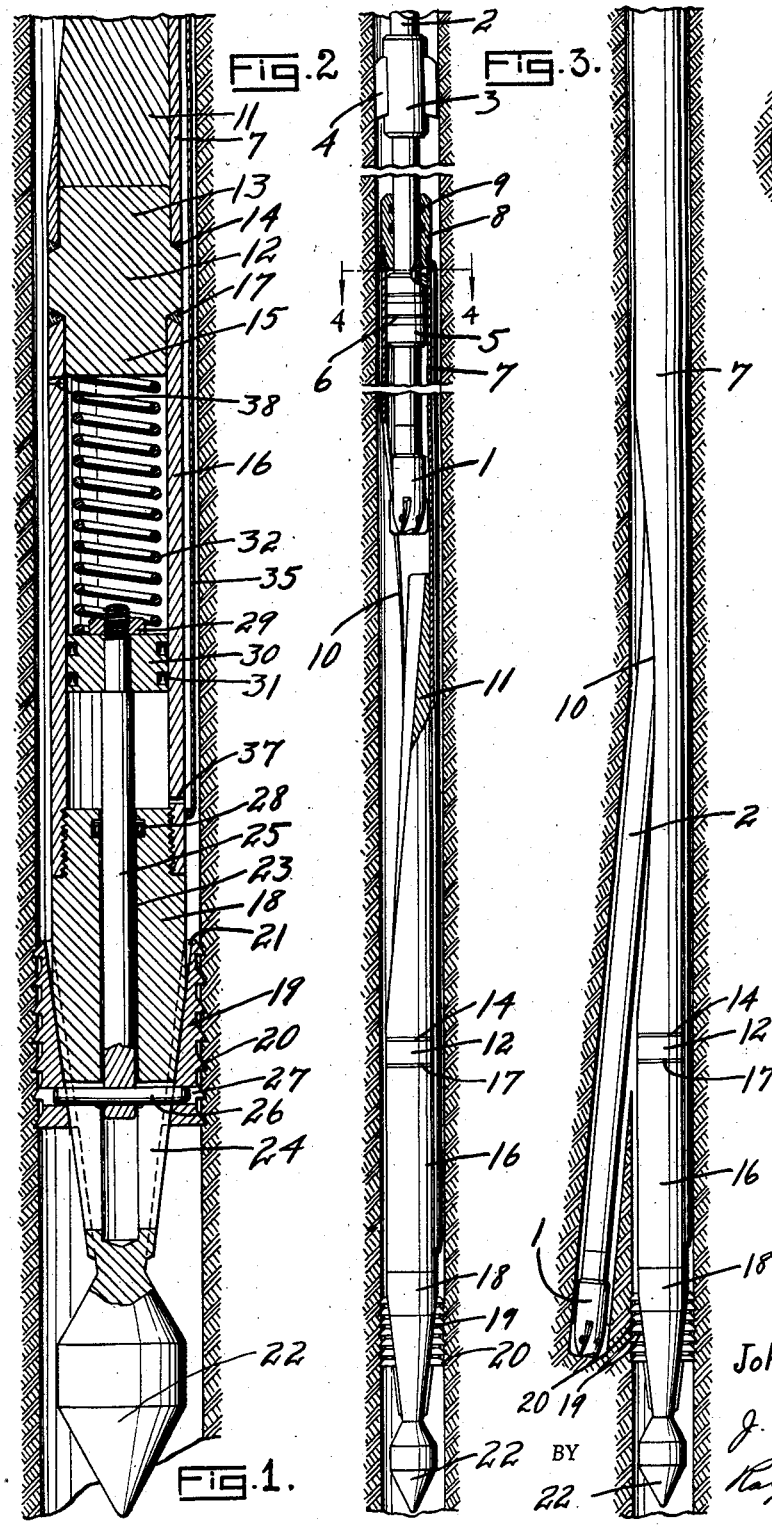
John C. Stokes.
INVENTOR.
ATTORNEYS

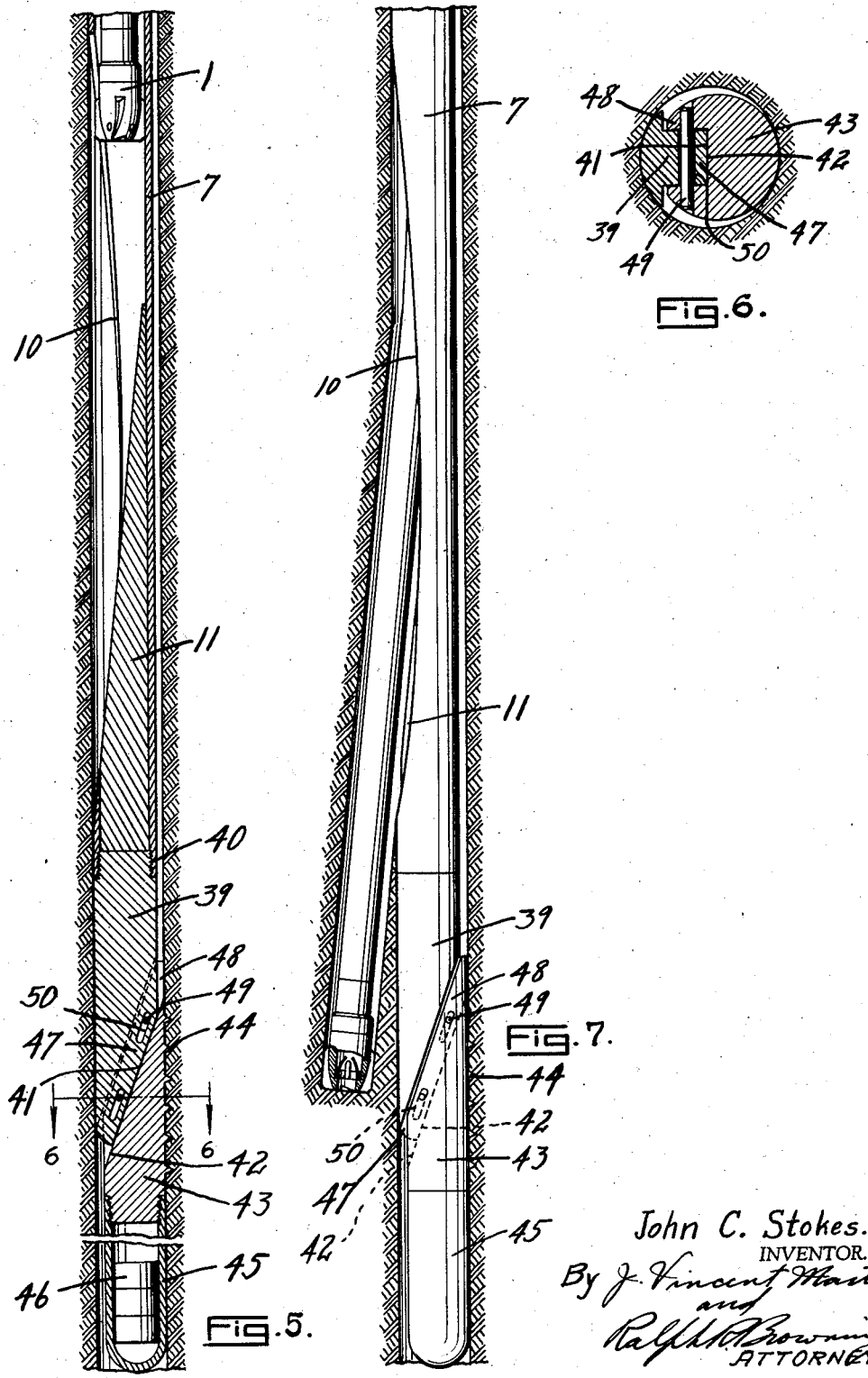

Patented Oct. 9, 1945

2,386,514

UNITED STATES PATENT OFFICE 2,386,514

SIDE HOLE CORING DEVICE

John C. Stokes, Houston, Tex., assignor to Reed Roller Bit Company, Houston, Tex., a corporation of Texas Application June 11, 1942, Serial No. 446,551

5 Claims. (Cl. 255—1.4)

This invention relates to a so-called side hole coring device for taking a core or sample of the formation from the side wall of a bore hole. It has for its general object the provision of such a device which may be employed to take a sample or core from the side wall of a bore hole at any position in the bore hole that may be desired, and to then withdraw the same from the bore hole for purposes of examination.

It has been proposed in the past that a sample taken from the side of a bore hole would be desirable and certain mechanisms have been devised which were intended for the purpose of taking such samples. However, such devices in the past have been complicated in structure and have for the most part been incapable of taking any sizeable sample. In many instances, furthermore, it has been impossible to determine the exact point along the length of the hole from which the sample would be taken and in many cases it has been impossible to determine whether the sample secured was one scraped superficially from the wall of the hole or one actually taken from the formation itself. For the most part also prior devices have been limited in their operation to relatively soft formations.

It is therefore an object of this invention to provide a side wall coring device which will be simple in structure and which may be set with accuracy to take a sample from any given locality along the length of a bore hole.

Another object is to provide such a structure which may be set and later released at any desired point within the well without necessity for the use of a wire line or its equivalent within the drill stem.

Another object of this invention is to provide such a structure in which a core of relatively large size and length may be secured.

Another object is to provide a device of the character referred to in which a core may be taken from a relatively hard formation.

Still another object of this invention is to provide a device which will take at all times an actual core of the formation as distinguished from a superficial scraping from the side of a bore hole.

One other object of this invention is to provide a novel means whereby the location of the sample taking device for the purpose of taking a core may be accurately determined and the sample taking device readily set for the purpose of taking a core at that point.

Other objects and advantages of this invention will become apparent from the following description taken in connection with the accompanying drawings wherein certain embodiments of this invention are illustrated.

In the drawings:

Fig. 1 is a longitudinal cross section through the lower end portion of a core taking apparatus constructed in accordance with this invention, showing the same anchored in position in a bore hole for the purpose of taking a core of the formation.

Fig. 2 is a view on a smaller scale showing the entire core taking device suitably anchored in a bore hole just prior to the taking of a core, the upper portion of the said device being shown partly in longitudinal cross section for purposes of illustration.

Fig. 3 is a view similar to Fig. 2 but showing the parts in side elevation during the course of taking a core.

Fig. 4 is a transverse cross section taken along the line 4—4 of Fig. 2.

Fig. 5 is a view similar to Fig. 2 but showing a modification.

Fig. 6 is a transverse cross section taken along the line 6—6 of Fig. 5.

Fig. 7 is a view similar to Fig. 3 but showing the modified form illustrated in Figs. 5 and 6.

Referring now more in detail to the drawings, the core bit or drill 1 which is actually the tool that cuts and receives the core is carried on the lower end of a drill stem 2 by which it may be rotated and moved upwardly and downwardly. This core bit or drill may be of any usual construction but is of somewhat smaller external diameter than the original diameter of the bore hole.

Incorporated in the drill stem a substantial distance above the drill 1 is a tool 3 having radially extending wall scraper blades 4 for the purpose of scraping mud from the sides of the hole and, maintaining the drill stem in a central location within the bore hole.

Also incorporated in the drill stem a substantial distance above the core drill 1 is a piston-like part 5 which preferably has packing rings 6 thereon and is of a size to form a fluid-tight sliding fit within the tubular member or sleeve 7. This tubular member or sleeve 7 extends downwardly from a point above the piston 5 to a point a substantial distance below the drill 1 as the device is being lowered into a well. At its upper end it is secured to a slide 8 which fits about the drill stem between the piston 5 and the guide 3. It fits fairly snugly about the drill stem and may be provided with sealing rings or packings 9 so as to form a seal about the drill stem. It will be seen that it is of a diameter such that it will fit over the drill stem but is of a smaller diameter than the external diameter of the core bit 1 or the piston 5.

Below the core drill 1 this tubular member is formed with a lateral window 10 through which the core drill is adapted to be deflected by means of a deflector or whipstock 11. This deflector or whipstock is merely a long tapering wedge-like member adapted to deflect the core drill as it is lowered against the whipstock so that the core drill will be moved to one side through the window 10 and dig into the formation in the side wall of the hole. This deflector or whipstock may be secured in the tubular member in any suitable manner. As illustrated, it rests at its lower end upon a connecting block 12 which has a part 13 fitting within the lower end of the tubular member 7 and welded or otherwise suitably secured thereto at 14. Similarly it has another part 15 fitting within the upper end of a cylindrical member 16 and secured thereto by means of welding or otherwise at 17. The lower end of this cylindrical member is internally threaded to receive the body 18 which provides a wedge mandrel for expanding the anchoring slips 19 when these slips are moved upwardly along the mandrel. The slips 19 have teeth 20 thereon which are downwardly directed so as to engage the formation and support the device against downward movement. The slips are preferably mounted on the mandrel by means of a dovetail engagement 21 so that they are prevented from moving directly radially outwardly from the mandrel. Any suitable type of guide 22 may be formed on the lower end of this mandrel.

The mandrel is provided with a central bore 23 and adjacent the lower end of this bore is provided with lateral openings 24 providing the communication between the bore and the tracks for the two slips 19. Located in this bore is a reciprocating shaft 25 having a pin 26 secured therein adjacent its lower end and extending laterally in each direction through the respective openings 24 to engage within openings 27 provided for the purpose in the respective slips 19. Suitable packing 28 is provided about this shaft within the bore 23.

The upper end of the shaft 25 is disposed within the cylinder 16 and has secured thereon by means of a nut 29 a piston 30 having packing rings 31 thereabout so as to form a seal between the piston 30 and the inner surface of the cylinder 16. This piston is constantly urged in a downward direction by means of a spring 32 disposed within the cylinder 16 and bearing at its lower end upon the piston 30 and at its upper end against the lower end of the connector 12.

With reference to Fig. 4 it will be seen that there is an opening 33 between the interior and exterior of the drill stem just above the piston 5 and that there is a similar opening 34 between the interior and exterior of the tubular member 7 just below the slide 8. Outside of the tubular member 7 and extending downwardly along this tubular member and along the exterior of the connector 12 and the cylinder 16 is a conductor 35 which may be merely a curved strip welded at its edges 36 to the outer surfaces of the tubular member 7, the connector 12 and the cylinder 16. The lower end of this conductor is in communication through an opening 37 with the interior of the lower end of the cylinder 16.

In operation the device is lowered into a bore hole with the parts in the position which they occupy in Fig. 2 of the drawings except that the slips 19 are not set. Instead, during this lowering operation the spring 32 will be holding the piston 30 in its lowermost position and while in this position the pin 26 will be holding the slips 19 in their lowermost or released position.

When a point is reached at which it is desired to take a core from the side of the bore hole, the drill stem is rotated with the blades at the level at which the slips are to be set, to remove the mud cake from the wall of the hole at this point. The device is then drawn up until the slips are at the proper level and fluid is pumped downwardly through the drill stem. Most of this fluid will, of course, pass out through the slush opening in the core drill 1, but a portion will pass through the openings 33 and 34, the conductor 35, and the opening 37 into the lower end of the cylinder 16 below the piston 30 thus forcing this piston upwardly. As the piston 30 moves upwardly the shaft likewise moves upwardly carrying with it the pin 26 and the slips 19. As these slips move upwardly along the body 18 they also move outwardly to engage the walls of the bore hole. With the slips thus expanded the weight of the device may be allowed to rest on these slips. Thereupon, rotation of the drill stem is begun and the drill stem and core drill 1 are lowered through the guide 8 until the drill 1 strikes the whipstock 11 and is deflected thereby into the formation at the side of the hole. It is deflected through the window 10 and further rotation and downward venting of the core drill will cause it to dig into the side wall of the bore hole and take a core therefrom in the well known manner.

During the setting of the slips as above described, the packings 6 on the piston 5 will prevent downward flow of fluid between the drill stem and the tubular member 7 while at the same time the packings 9 will prevent upward flow of such fluid around the outside of the drill stem. At the same time the fluid entering the cylinder 16 will be prevented from flowing upwardly past the piston 30 by the packing rings 31 and will be prevented from flowing downwardly along the shaft 25 by means of the packing ring 28. The space within the upper end of the cylinder 16 will be vented by some suitable opening such as indicated at 38.

After the core has been cut as above described, an upward pull on the drill stem will result in withdrawing the core drill from the formation back into the tubular member 7. As soon as the piston 5 reaches the position shown in Fig. 2, an upward pull will be exerted upon the tubular member 7. This upward pull will serve to pull the mandrel 18 upwardly and as soon as this movement starts it will release the slips 19 which will be moved to their lowermost position immediately under the influence of the spring 32. Thereupon the entire device may be removed from the bore hole and the core that remains within the drill and the lower end of the drill stem removed.

Referring to Figs. 5, 6 and 7, substantially the same type of device is illustrated except for the means for locking or setting the tubular member and deflector in a desired position in the bore hole. In this case the deflector 11 rests at its lower end on the upper end of the block 39 which is threadedly connected at 40 to the lower end of the tubular member. This block 39 corresponds in some ways to the mandrel 18 in that it has an inclined lower surface 41 adapted to receive a similarly inclined upper surface 42 on the gripping shoe 43 which has teeth 44 thereon adapted to bite into the formation. This gripping shoe 43 corresponds in function to the slips 19.

Secured to the lower end of the shoe 43 is a suitable container 45 adapted to contain weights 46. The shoe 43 and the block 39 have interfitting tongues and grooves, the tongue 47 in the instance illustrated being provided on the block 39 and the groove 48 in the adjacent surface of the shoe 43. Pins 49 extend between the portions on the opposite sides of the groove 48 and through slots 50 in the tongue 47 so as to hold the tongue and groove on these two members in engagement with each other while permitting the two members to slide longitudinally with respect to each other.

The tubular member 7 may be identical with that described in connection with Figs. 1 to 4 inclusive except that the conductor 35 will be unnecessary. Likewise, the piston 5 may be omitted if desired and the guide 8 may be allowed to butt directly against the core drill 1. In any event the device is lowered into the bore hole in the same manner as hereinbefore described until the point is reached where it is desired to set the deflector for the purpose of taking a core. The wall scraper is utilized as before to remove the mud cake from the side wall. The drill stem is then stopped, raised rapidly and then suddenly dropped. This sudden reversal of the movement of the drill stem will cause the shoe 43 with its attached weights 46 due to the inertia thereof, to be moved upwardly with respect to the block 39, and this movement will cause it to be expanded against the side wall of the bore hole as illustrated in Figs. 5 and 7. Thus it will catch and firmly anchor the deflecting member 11 against downward movement. Thereupon the core may be taken in the manner above described and upon retraction of the drill stem the tubular member 7 will be lifted thus lifting the block 39 and releasing the engagement between the shoe 43 and the side of the hole. The device may then be removed and the core taken out for examination.

From the foregoing it will be seen that a means has been provided whereby all of the objects and advantages sought by this invention may be secured.

Having described my invention I claim:

1. In a side hole coring device, a core drill, a drill stem carrying said drill on the lower end thereof, a whipstock below said core drill, lost motion means for suspending said whipstock from and below said core drill whereby said core drill may be moved downwardly toward and deflected laterally by said whipstock, a cylinder and a part having an outwardly and upwardly inclined surface carried by said whipstock, a piston in said cylinder, a slip in engagement with said inclined surface and adapted on upward movement of the slip with respect to said surface to expand into locking engagement with the wall of the hole, means connecting said piston and said slip whereby upward movement of the piston will cause setting of the slip, and means connecting said cylinder below said piston with the interior of said drill stem whereby fluid pressure may be applied to said piston to raise it and set said slip.

2. In a side hole coring device, a core drill, a drill stem carrying said drill on the lower end thereof, a whipstock below said core drill, lost motion means for suspending said whipstock from and below said core drill whereby said core drill may be moved downwardly toward and deflected laterally by said whipstock, a cylinder and a part having an outwardly and upwardly inclined surface carried by said whipstock, a piston in said cylinder, a slip in engagement with said inclined surface and adapted on upward movement of the slip with respect to said surface to expand into locking engagement with the wall of the hole, means connecting said piston and said slip whereby upward movement of the piston will cause setting of the slip, and means connecting said cylinder below said piston with the interior of said drill stem whereby fluid pressure may be applied to said piston to raise it and set said slip, and resilient means constantly urging said slip toward released position.

3. In a side hole coring device, a core drill, a drill stem connected to and suspending said core drill, a whipstock below said core drill, lost motion means for suspending said whipstock from and below said core drill whereby said core drill may be moved downwardly toward and deflected laterally by said whipstock, a cylinder and a part having an upwardly and outwardly inclined surface carried by said whipstock, a piston in said cylinder, a slip having an inclined surface slidably mounted upon said first mentioned inclined surface, means connecting said piston and slip whereby upon upward movement of said piston said slip will be moved upwardly and outwardly to engage the wall of a bore hole and anchor said whipstock against downward movement therein and a conduit extending from the lower end of said cylinder below said piston upwardly along the whipstock and communicating with the interior of said drill stem when the core drill is in its upper most position with respect to the whipstock whereby fluid pressure will be conducted downwardly from said drill stem to said cylinder for raising said piston and slip and latching said whipstock against downward movement in a bore hole.

4. In a side hole coring device, a core drill, a drill stem carrying said drill on the lower end thereof, a whipstock below said core drill, lost motion means for suspending said whipstock from and below said core drill whereby said core drill may be moved downwardly toward and deflected laterally by said whipstock, said lost motion means including a piston-like body on the drill stem, a tubular member carrying the whipstock and having the piston-like body slidably mounted therein, a closure for the upper portion of the tubular member providing a chamber above the piston-like body between the drill stem and tubular member, said drill stem having an opening affording access between the interior thereof and said chamber, a cylinder and a part having an outwardly and upwardly inclined surface carried by said whipstock, a piston in said cylinder, a slip in engagement with said inclined surface and adapted on upward movement of the slip with respect to said surface to expand into locking engagement with the wall of the hole, means connecting said piston and said slip whereby upward movement of the piston will cause setting of the slip, and conduit means connecting said cylinder below said piston with the interior of said chamber whereby fluid pressure may be applied to said piston to raise it and set said slip.

5. In a side hole coring device, a core drill, a drill stem carrying said drill on the lower end thereof, a whipstock below said core drill, lost motion means for suspending said whipstock from and below said core drill whereby said core drill may be moved downwardly toward and deflected laterally by said whipstock, said lost motion means including a piston-like body on the drill stem, a tubular member carrying the whipstock and having the piston-like body slidably mounted therein, a closure for the upper portion of the tubular member providing a chamber above the piston-like body between the drill stem and tubular member, said drill stem having an opening affording access between the interior thereof and said chamber, an anchoring device carried by the whipstock, a hydraulic actuator for said anchoring device, and conduit means interconnecting the hydraulic actuator with said chamber.

JOHN C. STOKES.